Patented Dec. 11, 1934

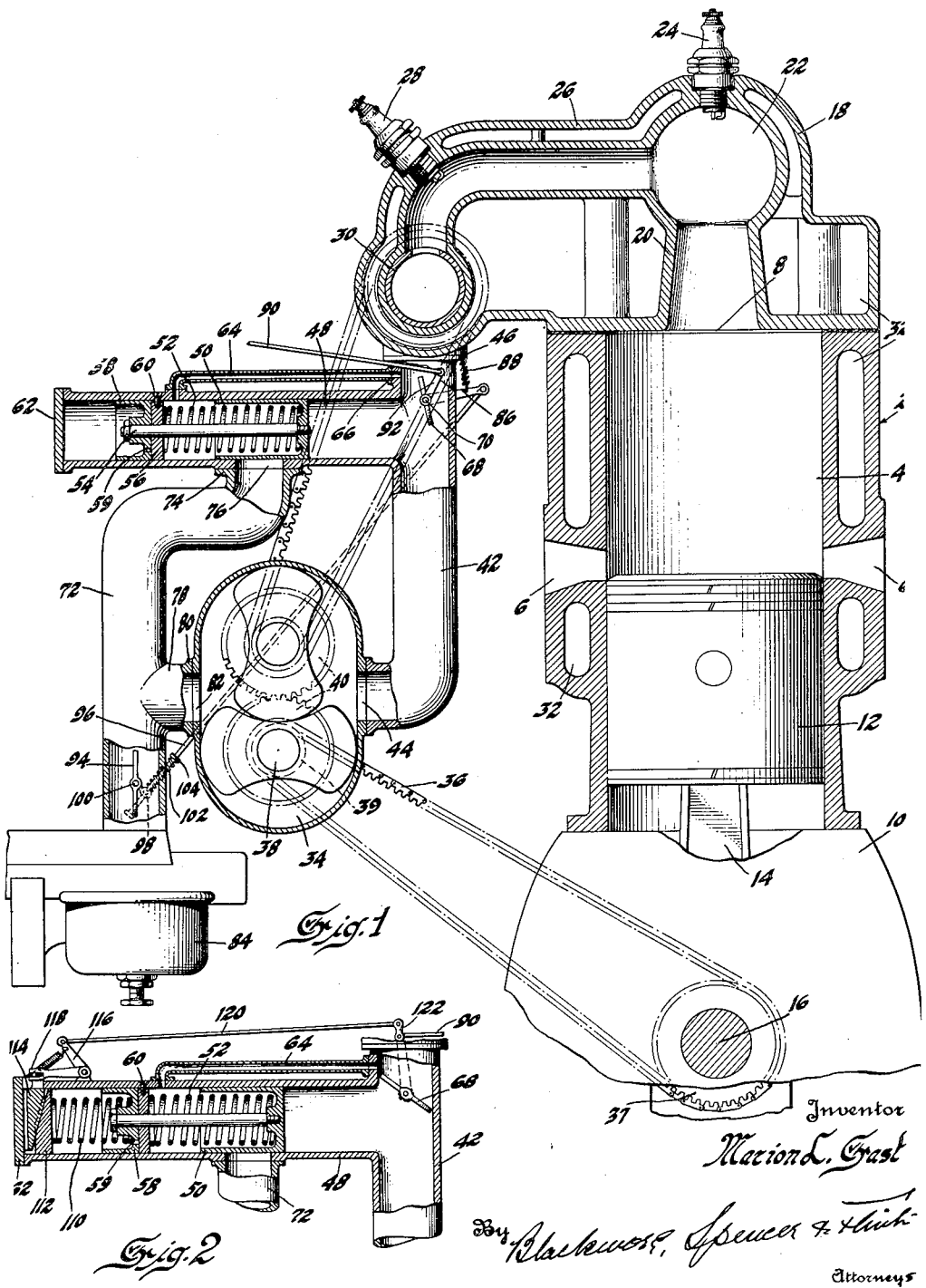
Dec. 11, 1934.  M. L. FAST  1,984,013
TWO-STROKE CYCLE ENGINE
Filed April 9, 1931

1,984,013

UNITED STATES PATENT OFFICE 1,984,013

TWO-STROKE CYCLE ENGINE

Marion L. Fast, Detroit, Mich., assignor, by mesne assignments, to General Motors Corporation, Detroit, Mich., a corporation of Delaware Application April 9, 1931, Serial No. 528,850

5 Claims. (Cl. 123—65)

This invention relates to improvements in two-cycle blower equipped engines and has particular reference to means for improving the idling and light load running of the engine.

Engines to which the invention is applied comprise the usual two-cycle cylinder with a blower arranged between the carburetor and combustion chamber and a throttle valve positioned between the blower and combustion chamber. The blower or supercharger is provided with a by-pass passage controlled by a valve, the valve operating when the supercharger pressure exceeds a given amount to cause the air from the blower to be by-passed and returned to the blower entrance.

In conducting experiments with blower equipped two-cycle engines having a throttle valve between the blower and combustion chamber, it was found that at slow speeds and idling the operation of the engine was unsatisfactory, the engine frequently stalling. By placing a second throttle valve between the carburetor and the blower, it was found that the supercharger was forced to work harder when this throttle was closed, thereby increasing the internal friction and causing the carburetted mixture passing through the blower to become heated to a higher degree. This second throttle valve also forced the supercharger to send a greater amount of combustible mixture into the firing chamber and thereby caused the engine to do a greater amount of work. At slow speeds and idling, this resulted in an increased consumption of fuel, or a loss in fuel economy, but this loss was justified by the better performance obtained.

The application of the additional throttle valve has resulted in an improved idling and slow speed performance. This throttle valve is interconnected with the usual throttle but is caused to operate faster and is in use only at slow speeds or idling. When the engine is running at higher speeds, the throttle is fully opened and remains fully opened until the engine is slowed down.

On the drawing:

Figure 1 is a representation of a blower equipped two-cycle engine with parts being conveniently arranged better to illustrate the structure of the engine.

Figure 2 is a modification of the valve construction shown in Figure 1.

Referring to the drawing, the numeral 2 indicates as a whole any multi-cylinder internal combustion engine. The engine has the usual cylinders 4 having the exhaust ports 6 and the intake ports 8. The crankcase is indicated at 10, the pistons at 12 and the connecting rods at 14. The piston is connected to the usual crankshaft, the axis of which is indicated at 16. At the top of the cylinder, there is applied any suitable combustion head 18 which, for purposes of disclosure only, is of the special type shown. The combustion chamber for each cylinder includes the neck portion 20 connected at one end to the inlet 8 and at its other end having formed therein the rounded combustion chamber 22. This combustion chamber has the usual spark plug 24 at the top thereof. Connected to the combustion chamber 22 is the pipe 26 which also forms a part of the combustion chamber head 18. The pipe 26 has a usual spark plug 28 which preferably is positioned immediately beyond the rotary valve 30 which controls the admission of carburetted air to the combustion chambers 22, 26. The numeral 32 indicates the usual water cooling system of the engine.

A blower 34 of any suitable type is interconnected with the crankshaft of the engine by any suitable driving means such as the chain 36 and gears 37, 39 which drive the shaft 38 of the blower. The blower in the present instance comprises two figure 8 rotors of the usual type interconnected by means of the gears 40. A pipe 42 is connected to the outlet 44 of the blower and extends upwardly and is connected as at 46 to the inlet to the combustion chamber 26 at the rotary valve 30. The pipe 42 also includes the lateral by-pass extension 48 in which there is positioned the valve 50 held in the position by the coil spring 52 as shown in Figure 1. The piston valve 50 has connected thereto the stem 54 which passes through a spacer 56 in the by-pass conduit 48, and a second piston 58 is connected to the end of the stem 54 at the other side of the spacer 56. The piston 58 operates in the end of the by-pass extension 48 and has a small air flow opening 59 therein. The piston 58 forms a dashpot. The spacer 56 is rigidly secured in place by one or more screws 60. A suitable end closure 62 is provided for the end of the by-pass conduit 48.

A pipe 64 of relatively small bore is connected at one of its ends to the by-pass conduit 48 between the piston valve 50 and the spacer 56 and at its other end to the upright portion of the pipe 42 below the valve 30 at 66. The purpose of this pipe is to communicate to the spring side of the piston valve 50 the pressure in the upper portion of the conduit 42 on the combustion chamber side of the throttle valve 68. When the throttle 68 closes, the pressure on the combustion chamber side decreases because the size of the opening is decreased and the blower is able to force less carburetted air past the throttle. This decreased pressure should maintain on the spring side of the valve 52 so that the increased pressure built up by the blower in the pipe 42 readily will open the valve.

The throttle 68 is pivotally mounted on the shaft 70 and is positioned in the pipe 42 at or immediately beyond the by-pass conduit 48. The throttle is so positioned that in its closed position, it will be below the connection 66 of the pipe 64 with the conduit 42. The shaft 70 of the throttle valve 68 has the usual lever arm 86 and a spring 88 secured to the lever arm and to the joint at 46 and always urges the throttle valve to closed position. A rod 90 attached to a second lever arm 92 secured to the shaft 70 serves to operate the throttle valve.

A second pipe 72 is connected as at 74 with the pipe 48 and is in communication therewith through the opening 76. The pipe 72 has a branch 78 connected at 80 to the inlet 82 to the blower 34. The lower end of the pipe 72 has the usual carburetor 84 attached thereto.

The essence of the invention resides in the placing of a second throttle valve 94 between the carburetor 84 and the blower 34. This throttle valve is connected by means of a rod 96 with the arm 86 so as to be simultaneously operated with the throttle 68. The lever arm 98 on the shaft 100 of the throttle 94 is shorter than the arm 86 of the throttle 70, which will cause the throttle 94 to move faster. The lower throttle continues to remain wide open until the engine load is reduced about one fourth and from one fourth to idle it closes rapidly and is substantially entirely closed at idling speeds. The throttle 94 will therefore be in full open position, as shown in the drawing, while the throttle 68 must be moved farther before it arrives at its full open position. A lost motion connection comprising a coil spring 102 held between the arm 98 and a rigid collar 104 on the rod 96 permits the throttle 68 to move and the throttle 94 to be held in full open position. The end of the rod 96 passes through an over-sized opening in the end of the lever 98.

In the position of the parts shown in the drawing, the engine is no longer at slow speed or idling but is running at a good rate of speed. If it is desired to slow down the engine, the rod 90 will be moved to move the throttle 68 to decrease the amount of carburetted mixture flowing to the combustion chamber 22, 26. After a given movement of the throttle 68, the throttle 94 also will move toward closed position. When the throttles are approaching their closed position, the blower will increase the pressure in the conduit 42 and the excess pressure will farther move the piston valve 50 against the tension of the spring 52 to cause the greater portion of the carburetted air to by-pass through conduits 48 and 72 and reenter the blower at the inlet 82. The closing of the throttle 94 will increase the pull and increase the internal friction of the supercharger causing it to work harder and bring about a greater heating of the mixture. With the throttle 94 near closed position, the throttle 68 will be open to a greater extent than if no throttle 94 were used. The size of the opening at the throttle 68 will therefore be relatively larger which allows the blower to force more carburetted mixture into the combustion chamber. This additional mixture will give a better performance of the engine and cause the engine to work harder. The additional work performed by the engine is substantially entirely absorbed in the additional friction in the blower which works harder and requires additional power to drive it. There is a deliberate decrease in fuel economy, or the efficiency of the engine, to obtain a better idling performance but the results justify the means.

The closing of the lower throttle 94 tends to increase the vacuum at the blower inlet which has several effects; first, it causes the blower to work against a higher pressure differential which improves the running at idling and slow speeds although it is not desirable from a fuel economy standpoint and it improves the idling of the engine because the engine has some additional work to overcome; second, it is desirable to have the lower throttle 94 from the carburetion standpoint because, insofar as present carburetors are concerned, they are designed for correct metering at low air flow only when throttled. The carburetor will not give a correct metering with the low air flow when they are on wide open throttle; third, the extra work done by the blower because of the restriction heats the fuel charge and obviates the necessity of a hot spot. In Figure 2, another way of accomplishing the same result is shown by modifying the action of the valve 50. A second spring 110 is positioned between the dashpot piston 58 and a pair of cam-shaped elements 112 and 114 in the conduit 48 at the end closure 62. The cam element 112 slides in the conduit 48 while the cam element 114 is raised by the bell crank lever 116. One end 118 of one arm of the bell crank is slotted to receive a pin on the cam element 114 while the other arm of the ball crank is connected by means of a rod 120 to an arm 122 connected to the usual rod 90 which operates the throttle valve 68. As the throttle valve is opened, the rod 120 will swing the bell crank 116 to raise the cam 114 and thereby decrease the amount of spring tension exerted by the springs 110 and 52 against the piston valve 50. This will permit the blower pressure inside the conduit 42 easier to operate the valve 50 to allow the carburetted mixture to be by-passed through the pipe 72. When the throttle is being moved from open to closed position, the cam 114 will be moved toward the position shown in Figure 2 which will tend to shove the valve 50 to the right and necessitate an increase of pressure in conduit 42 to move the valve against the tension of the springs 52 and 110. This building up of pressure will cause the blower to work harder and because of the increased pressure built up in conduit 42, an increased amount of fuel is sent to the combustion chamber. The same effects are produced as in the case of the species of Figure 1.

As previously stated, the heating of the charge in the blower makes unnecessary a hot spot (such as a heated part of the intake manifold) to heat the carburetted mixture. Engines using a hot spot are less efficient at full load conditions because the increased heat of the exhaust adds more heat to the fuel and thereby decreases the volumetric efficiency. In the disclosure of the instant application, the volumetric efficiency is not decreased at full load for the reason that the blower and by-pass arrangement maintain substantially a constant pressure in the combustion chamber. The heat is supplied by the extra work performed by the blower.

I claim:

1. In a control for a two-cycle internal combustion engine having a blower, an admission valve, and a carburetor, a first throttle between the blower and the valve, a second throttle between the carburetor and the blower, and means to operate said throttles, said means operating said second throttle faster than said first throttle.

2. In a control for a two-cycle internal combustion engine having a carburetor, an admission valve, and a blower, a first throttle between the blower and the valve, a second throttle between the carburetor and the blower, means to operate said throttles, said means operating said second throttle faster than said first throttle, said means having a lost motion connection with said second throttle whereby said means will at times be operative to move said first throttle without moving said second throttle.

3. In a device to improve the idling and slow running speeds of a two-cycle internal combustion engine having a blower and a carburetor, a plurality of throttles interconnected to control the fuel mixture delivered by the blower, said blower positioned between the throttles, and a by-pass from the blower and between said throttles to relieve the blower pressure when the throttles are closed, means controlling the flow through the by-pass and operated by the pressure therein, said by-pass causing the carburetted mixture to flow through the blower and by-pass conduit.

4. In a two-cycle engine having a carburetor and a blower, a throttle between the blower and carburetor, means to operate the throttle, a by-pass to cause excess carburetted air from the blower to return to the blower inlet, a valve in the by-pass, said valve operated by the pressure in the by-pass, and a throttle between the blower and engine and operated simultaneously with said first-named throttle and from said throttle operating means, to increase the pressure in the by-pass to cause the blower to perform additional work.

5. In a control for a two-cycle internal combustion engine having a blower, an admission valve, and a carburetor, a first throttle between the blower and valve, a second throttle between the carburetor and the blower, a by-pass around the blower and between the throttles, means to control the flow of carburetted air through the by-pass operated by the pressure in the by-pass and means to operate said throttles.

MARION L. FAST.